Feb. 9, 1937. E. GATHMANN 2,070,533
INGOT MOLD ASSEMBLY
Filed April 17, 1935 2 Sheets-Sheet 1
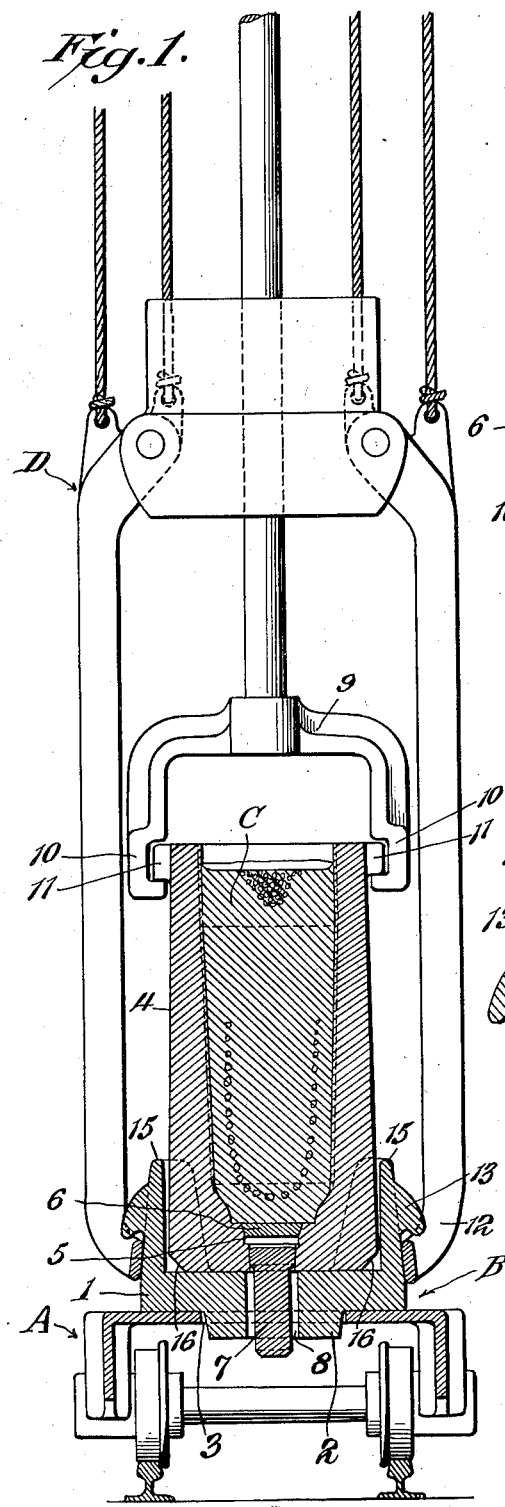
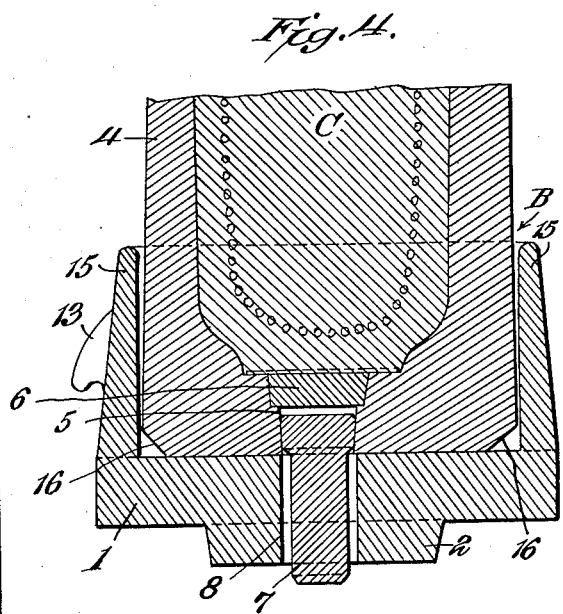
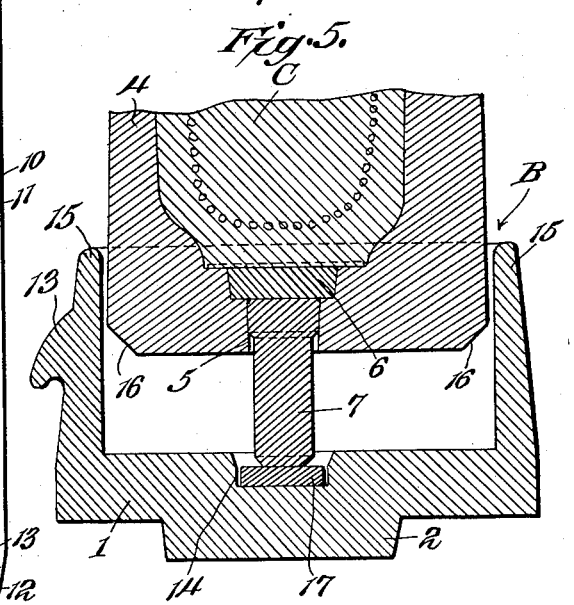
Inventor,
Emil Gathmann.
By Baldwin + Wight
Attorneys

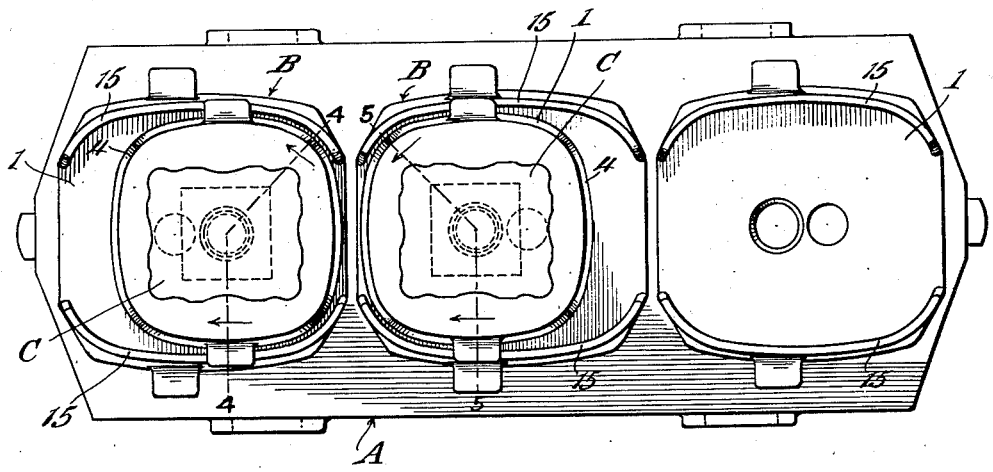
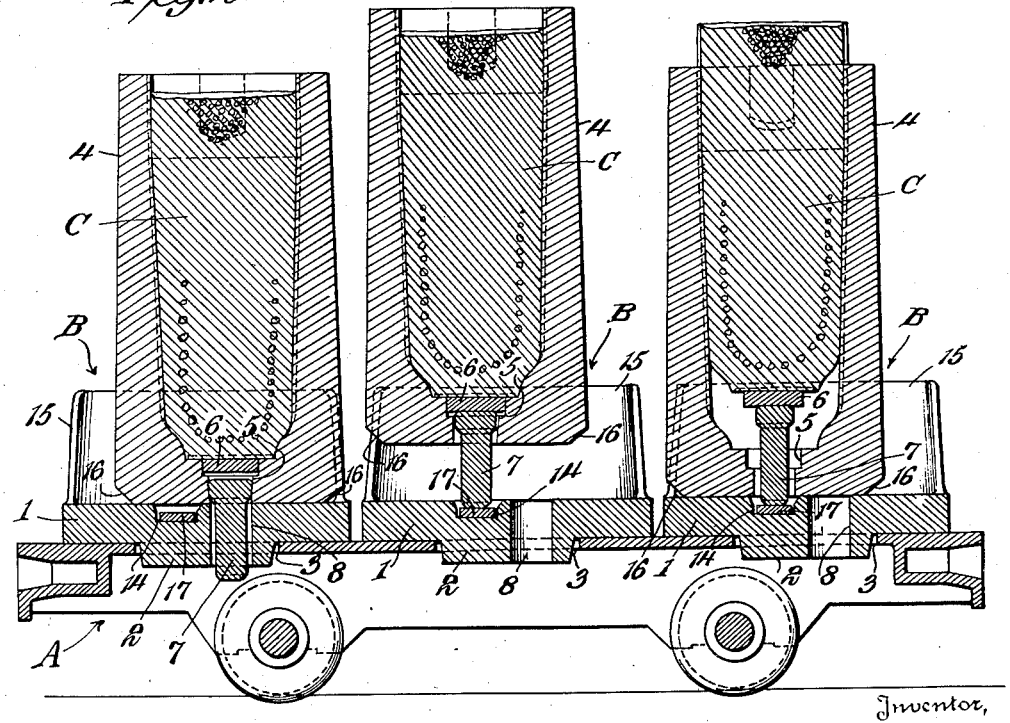

Patented Feb. 9, 1937

2,070,533

UNITED STATES PATENT OFFICE 2,070,533

INGOT MOLD ASSEMBLY

Emil Gathmann, Baltimore, Md., assignor to Gathmann Research Incorporated, Catonsville, Md., a corporation of Maryland Application April 17, 1935, Serial No. 16,936

7 Claims. (Cl. 22—95)

This invention relates to ingot mold assemblies and more particularly to mold assemblies constructed and arranged with a view to facilitating stripping of ingots formed in the molds.

Mold assemblies in accordance with the present invention are more especially adapted for use in connection with stripping apparatus of the kind shown in my prior Patents 1,059,667 and 1,059,668, both of April 22, 1913, although they may be used to advantage with other apparatus. In my prior patents there are disclosed apparatus for stripping ingots from big-end-up molds equipped with bottom stripping rods projecting below the bottom of the molds, such apparatus comprising in general means for bodily lifting such a mold and then positively lowering the mold with the lower end of the stripping rod in engagement with a fixed abutment, thus moving the rod relatively upward and stripping the ingot partially from the mold. Mold assemblies in accordance with the present invention embody improvements over those disclosed in the prior patents referred to as regards both facility and speed of operation, and length of life of essential parts.

An object of the invention is to provide an improved mold assembly so constructed and arranged as to facilitate quick and accurate handling of the mold when setting up the assembly preparatory to pouring and when moving the mold during the stripping operation.

Another object is to provide a mold assembly of the character referred to including means for prolonging the life of the stripper rod, which is a relatively heavy and somewhat expensive part.

Other objects will become apparent from a reading of the following description, the appended claims, and the accompanying drawings, in which:

Figure 1 is a vertical sectional view of a mold assembly embodying the invention and showing in elevation parts of a lifting and lowering mechanism of the type disclosed in my prior Patent 1,059,667;

Figure 2 is a longitudinal sectional view of a mold transfer car and three mold assemblies thereon, the molds being shown in different positions;

Figure 3 is a top plan view of the parts disclosed in Figure 2 with the exception that the mold shown at the right hand end of Figure 3 is omitted from Figure 2;

Figure 4 is a section taken on the line 4—4 of Figure 3 and drawn on an enlarged scale; and Figure 5 is a section taken on the line 5—5 of Figure 3 and drawn on an enlarged scale.

In the accompanying drawings, which illustrate only one embodiment of the invention, there is shown a mold car A serving as a mobile support for three mold assemblies generally designated B, the mold of each containing a rimming steel ingot C, and mold-handling means generally designated D.

The mold of the assembly B shown at the left in Figure 2 is in the position occupied before the stripping operation has been commenced, the intermediate mold is in the position occupied just before stripping has been effected, and the mold at the right is in the position occupied after stripping has been effected.

Each mold assembly includes a stool 1 supported on the car A and formed with a bottom pad or boss 2 received by an opening 3 in the car for maintaining the stool against horizontal movement on the car. A big-end-up mold proper 4 is supported upon each stool and is provided with a bottom opening 5 closed by means of a closure plug 6. A stripping device or rod 7 is positioned within each mold bottom opening 5 and, when the mold is in the position shown at the left in Figure 2, the rod 7 has its upper end in engagement with and supported by the walls of the lower end of the tapered bottom opening 5. A vertically extending opening 8 in the stool serves freely to accommodate the lower projecting end of the stripping rod 7 when the mold is in the position shown at the left in Figure 2. As shown, the opening 8 extends completely through the stool, but it will be appreciated that the opening may, if desired, terminate short of the bottom of the stool, providing the opening is deep enough to accommodate the entire projecting end of the stripping rod.

The parts described thus far are similar in their general construction and arrangement to the mold assembly disclosed in my prior Patent 1,059,667 previously referred to.

In operation, a mold lifter 9 having channeled arms 10 is brought into engagement with lugs 11 on the top of the mold, and the mold lifted until the lower end of the stripping rod 7 is raised slightly above the top of the stool 1. The mold then is moved horizontally to remove the stripping rod 7 from registration with the stool opening 8, as indicated by the showing of the centermost of the intermediate mold in Figure 2. The lifting device 9 is then moved positively downward, bringing the stripping rod 7 into engagement with the stool. Continued downward movement of the mold will then effect relative upward movement of the ingot within the mold, causing the ingot and mold to occupy the relative positions shown at the right in Figure 2. Preferably, in order to relieve the car of undue strains during the stripping operation, the stool is held against downward movement by means of holding arms 11 which are adapted to be moved under and then upward into engagement with lugs 13 on the stool, as described in my Patent 1,059,667.

In accordance with a feature of the present invention, the parts of the mold assembly are so constructed and arranged as to facilitate proper positioning of the molds while placing the molds on the stools preparatory to pouring, and also to position the molds horizontally with respect to the stools during the stripping operation. For this purpose, each stool is provided with a recess 14 spaced horizontally from the stool opening 8 and of less depth than the length of the downwardly projecting part of the stripping rod 7. After a mold has been lifted from the position shown at the left in Figure 2, wherein the stripping rod 7 is in inoperative position, the mold is moved to the left until the stripping rod is directly above the recess 7, as may be determined by observation. The mold is then lowered so as to cause the lower end of the stripping rod to engage the bottom of the recess 14, and this will occur before the mold proper has been lowered completely to the stool, so that further movement of the mold in a downward direction will effect stripping of the ingot. By virtue of the provision of the recess 14, there is less likelihood of the operator's lowering the mold without due regard for its proper positioning relative to the associated stool, and the danger of causing the mold or car to tip because of proper relative positioning is eliminated.

As a further aid to the proper and quick positioning of the mold, I prefer to provide the stools with guide means 15 extending upwardly from the sides of the stool and adapted to engage the outer surfaces of the molds. Initial introduction of the molds between the guide means 15 may be further facilitated by chamfering the lower edges of the molds as indicated at 16. It will be understood that, when moving a mold from the position shown at the left in Figure 2 to the position shown in the middle of Figure 2, the mold will be raised only far enough to bring the bottom end of the stripping rod above the base of the stool, the bottom of the mold proper then still extending below the tops of the guides 15. The mold is then moved horizontally to the left with respect to the stool until its advancing corner faces bump against the in-turned ends of the guides 15, after which the mold will be lowered. The guide means 15 of cars are so located relative to the stool recess 14 as to guide the mold downwardly in such position that the stripping rod 7 will enter the recess 14. Although under present practice ingot molds are made to fairly close tolerances even as regards outside dimensions, I prefer to provide substantial clearances between the guides 15 and the outside surfaces of the molds so as to prevent any jamming due to a poorly dimensioned mold. In order to make sure, however, that the guides 15 will always guide the mold down to a position in which the stripping rod 7 will enter either the stool opening 8 or the recess 14, clearances between the rod 7 and the opening and recess are provided and are made considerably larger than the clearances between the outside of the mold and the guides 15. Preferably, the outside clearance should be about two-thirds as great as the clearances between the rod 7 and the stool opening and recess.

Another important feature of the invention consists in the provision of means for prolonging the life of the stripping rods. These elements have to transmit considerable lifting effort, and necessarily are quite heavy and expensive, usually being constructed of steel. In use, the lower ends of the stripping rods heretofore have been brought down against a hard cast iron stool, and the tremendous pressures acting on the stripping rod have caused the lower end to become mashed and thus rendered unfit for further use, requiring frequent replacement. To overcome this difficulty, I have provided means for protecting the lower end of the stripping rod, in the form shown comprising an abutment of relatively soft material such as a plate 17 which is carried by the stool and against which the lower end of the stripping rod is brought into engagement during the stripping operation. In the form shown, the plate 17 may be placed removably within the stool recess 14. It will be understood that the abutment 17 should be of relatively soft material as compared to the material comprising the stripping rod 7. Suitable materials are low carbon steel and wrought iron, although other materials are satisfactory provided of course that they are softer than the material of the stripping rod. It will readily be appreciated that the provision of the abutment 17 prevents damage to the lower end of the stripping rod even in cases where the ingot has a tendency to stick in the mold, requiring the application of unusually large stripping pressure. The abutments, of course, being relatively small, are inexpensive and may be replaced as frequently as necessary.

It is apparent that mold assemblies embodying my invention render the stripping operation more easily and quickly performable than heretofore, as well as eliminating to a large extent the difficulties previously met in commercial operation because of improper positioning of the molds during the stripping operation. Moreover, the useful life of the somewhat expensive stripping rods is materially lengthened, resulting in a lower net cost per ton of steel produced.

The mold assembly shown by way of illustration embodies the invention in a practical and the, at present, preferred form, but it will be understood that changes may be made in the specific construction and relative arrangement of the parts without departing from the invention as defined in the claims.

I claim:

1. In an ingot mold assembly of the class wherein a stripping device has its upper end positioned in an opening in the bottom of a horizontally and vertically movable mold and has its lower end portion extending downwardly below the bottom of the mold for engagement with a relatively stationary abutment when the mold is lowered for effecting movement of the stripping device upwardly through the mold bottom opening and stripping of the ingot from the mold, the combination with said mold and stripping device of a stool upon which the mold is removably positioned, said stool having a vertically extending opening for receiving freely the lower end portion of said stripping device in inoperative position of the latter, and also having a recess adjacent said opening but horizontally spaced therefrom and remote from the edges of said stool, the bottom of said recess being engageable by the bottom end of said stripping device upon movement of the mold and stripping device horizontally to a point over said recess and then downwardly, whereby the said bottom of the recess will act as an abutment to effect upward movement of said stripping device relative to the mold; and guide means fixed to said stool and adapted to guide the mold, when the latter is being lowered, so as to bring said mold bottom opening into substantial alignment with either the stool opening or the stool recess.

2. In an ingot mold assembly of the class wherein a stripping device has its upper end positioned in an opening in the bottom of a horizontally and vertically movable mold and has its lower end portion extending downwardly below the bottom of the mold for engagement with a relatively stationary abutment when the mold is lowered for effecting movement of the stripping device upwardly through the mold bottom opening and stripping of the ingot from the mold, the combination with said mold and stripping device of a stool upon which the mold is removably positioned, said stool having a vertically extending opening for receiving freely the lower end portion of said stripping device in inoperative position of the latter, and also having a recess adjacent said opening but horizontally spaced therefrom and remote from the edges of said stool, the bottom of said recess being engageable by the bottom end of said stripping device upon movement of the mold and stripping device horizontally to a point over said recess and then downwardly, whereby the said bottom of the recess will act as an abutment to effect upward movement of said stripping device relative to the mold, there being clearance between the mold and said guide means and larger clearances between said stripping device and the walls of said stool opening and stool recess.

3. In an ingot mold assembly of the class wherein a stripping device has its upper end positioned in an opening in the bottom of a horizontally and vertically movable mold and has its lower end portion extending downwardly below the bottom of the mold for engagement with a relatively stationary abutment when the mold is lowered for effecting movement of the stripping device upwardly through the mold bottom opening and stripping of the ingot from the mold, the combination with said mold and stripping device of a stool upon which the mold is removably positioned, said stool having a vertically extending opening for receiving freely the lower end portion of said stripping device in inoperative position of the latter, and also having a recess adjacent said opening but horizontally spaced therefrom, a removable plate in the bottom of the recess and being engageable by the bottom end of said stripping device upon movement of the mold and stripping device horizontally to a point over said recess and then downwardly, whereby said plate will act as an abutment to effect upward movement of said stripping device relative to the mold, said plate being composed of softer material than said stripping device and stool.

4. In an ingot mold assembly of the class wherein a stripping device has its upper end positioned in an opening in the bottom of a horizontally and vertically movable mold and has its lower end portion extending downwardly below the bottom of the mold for engagement with a relatively stationary abutment when the mold is lowered for effecting movement of the stripping device upwardly through the mold bottom opening and stripping of the ingot from the mold, the combination with said mold and stripping device of a stool upon which the mold is removably positioned, said stool having a vertically extending opening for receiving freely the lower end portion of said stripping device in inoperative position of the latter, and also having a recess adjacent said opening but horizontally spaced therefrom, a removable plate in the bottom of the recess and being engageable by the bottom end of said stripping device upon movement of the mold and stripping device horizontally to a point over said recess and then downwardly, whereby said plate will act as an abutment to effect upward movement of said stripping device relative to the mold, said removable plate being made of material softer than the material of which the stripping device is made.

5. In an ingot mold assembly of the class wherein a stripping device has its upper end positioned in an opening in the bottom of a horizontally and vertically movable mold and has its lower end portion extending downwardly below the bottom of the mold for engagement with a relatively stationary abutment when the mold is lowered for effecting movement of the stripping device upwardly through the mold bottom opening and stripping of the ingot from the mold, the combination with said mold and stripping device of a stripper rod abutment formed of material which is relatively soft as compared to the material of which the stripper rod is formed.

6. An ingot mold stool comprising a supporting part formed with an opening extending vertically therethrough and adapted freely to accommodate a stripper rod and also being formed with a relatively shallow closed bottom guide recess and stripper rod abutment adjacent to but having no connection with said opening.

7. An ingot mold stool comprising a supporting part formed with an opening extending vertically therethrough and adapted freely to accommodate a stripper rod and also being formed with a relatively shallow closed bottom guide recess adjacent to but having no connection with said opening; and a removable stripper rod abutment plate in said recess, said plate having a thickness less than the depth of said recess and being composed of softer material than the stool.

EMIL GATHMANN.